(12) United States Patent
Reisch

(10) Patent No.: US 11,754,158 B2
(45) Date of Patent: Sep. 12, 2023

(54) GEAR UNIT FOR A VEHICLE AND POWERTRAIN WITH SUCH A GEAR UNIT

(71) Applicant: ZF FRIEDRICHSHAFEN AG, Friedrichshafen (DE)

(72) Inventor: Matthias Reisch, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/950,790

(22) Filed: Sep. 22, 2022

(65) Prior Publication Data

US 2023/0102032 A1 Mar. 30, 2023

(30) Foreign Application Priority Data

Sep. 27, 2021 (DE) ..................... 10 2021 210 740.0

(51) Int. Cl.
*B60K 1/00* (2006.01)
*B60K 17/16* (2006.01)
(Continued)

(52) U.S. Cl.
CPC ....... *F16H 37/0813* (2013.01); *B60K 17/165* (2013.01); *F16H 48/10* (2013.01); *F16H 48/22* (2013.01); *B60K 17/046* (2013.01); *B60K 17/08* (2013.01); *B60K 2001/001* (2013.01); *F16H 2200/0021* (2013.01); *F16H 2200/0034* (2013.01); *F16H 2200/201* (2013.01);
(Continued)

(58) Field of Classification Search
CPC ...... F16H 37/0813; F16H 48/10; F16H 48/22; F16H 2200/0021; F16H 2200/0034; F16H 2200/201; F16H 2200/2012; F16H 2200/2035; F16H 48/36; F16H 3/62; F16H 3/663; B60K 17/165; B60K 17/046; B60K 2001/001

See application file for complete search history.

(56) References Cited

U.S. PATENT DOCUMENTS

| 10,920,859 B2 * | 2/2021 | Conlon .................... F16H 48/10 |
| 10,982,745 B2 * | 4/2021 | Holmes .................... B60K 1/00 |
| 2020/0062114 A1 * | 2/2020 | Holmes .................... F16H 48/05 |

FOREIGN PATENT DOCUMENTS

DE 102019205747 10/2020

OTHER PUBLICATIONS

Office Action for corresponding German Patent Application No. 10 2021 210 740.0.

* cited by examiner

*Primary Examiner* — Tinh Dang
(74) *Attorney, Agent, or Firm* — Cozen O'Connor

(57) ABSTRACT

Gear unit with an integral differential arranged between an input shaft and two output shafts, having a first and a second planetary gearset with gearset elements. One gearset element is connected to an epicyclic gear train input, an output of the epicyclic gear train and a stationary component of the gear unit. A first gearset element is connected to the input shaft, a second gearset element is connected to the first output shaft, and a third gearset element is connected to a first gearset element of the second planetary gearset. A second gearset element is connectible to a second gearset element of the epicyclic gear train. A third gearset element is connected to the second output shaft. A first gearset element of the epicyclic gear train is connected to the input shaft. A third gearset element of the epicyclic gear train is connected to the stationary structural component.

17 Claims, 3 Drawing Sheets

(51) Int. Cl.
*B60K 17/04* (2006.01)
*F16H 37/08* (2006.01)
*F16H 48/10* (2012.01)
*F16H 48/22* (2006.01)
*B60K 17/08* (2006.01)
(52) U.S. Cl.
CPC ................ *F16H 2200/2012* (2013.01); *F16H 2200/2035* (2013.01)

GEAR UNIT FOR A VEHICLE AND POWERTRAIN WITH SUCH A GEAR UNIT

BACKGROUND OF INVENTION

1. Field of the Invention

The disclosure is directed to a gear unit for a powertrain of a vehicle, a powertrain with such a gear unit, and a vehicle with such a powertrain.

2. Description of Related Art

DE 10 2019 205 747 A1 discloses a gear unit with an input shaft and two output shafts, a first planetary gearset and a second planetary gearset connected to the first planetary gearset, these planetary gearsets each comprising a plurality of elements. The first output shaft is connected to a second element of the first planetary gearset so as to be fixed with respect to rotation relative to it, the second output shaft is connected to a third element of the second planetary gearset so as to be fixed with respect to rotation relative to it, a third element of the first planetary gearset is connected to a first element of the second planetary gearset via a shaft so as to be fixed with respect to rotation relative to it, and a second element of the second planetary gearset is secured to a structural component which is fixed with respect to relative rotation. The gear unit further comprises a third planetary gearset having three elements and two shifting elements. A first shifting element is formed to block the third planetary gearset in that two of its elements are connected so as to be fixed with respect to relative rotation. A second shifting element is formed to secure a first element of the third planetary gearset to the structural component which is fixed with respect to relative rotation. A second element of the third planetary gearset is connected via an intermediate shaft to the first element of the first planetary gearset so as to be fixed with respect to rotation relative to it. Further, a third element of the third planetary gearset is connected to the input shaft so as to be fixed with respect to rotation relative to it.

SUMMARY OF THE INVENTION

It is the object of one aspect of the present invention to provide a space-saving gear unit for a powertrain and a powertrain for a vehicle with improved overall efficiency.

According to a first aspect of the invention, a gear unit for a powertrain of a vehicle has an input shaft, a first output shaft, a second output shaft and an integral differential which is operatively arranged between the input shaft and the two output shafts, comprising a first planetary gearset with a plurality of gearset elements and a second planetary gearset with a plurality of planetary gearset elements, this second planetary gearset being operatively connected to the first planetary gearset, further comprising an epicyclic gear train having a plurality of gearset elements, one gearset element being connected in each instance to an input of the epicyclic gear train, an output of the epicyclic gear train and a stationary structural component of the gear unit so as to be fixed with respect to relative rotation. A first gearset element of the first planetary gearset is connected to the input shaft so as to be fixed with respect to rotation relative to it, a second gearset element of the first planetary gearset is connected to the first output shaft so as to be fixed with respect to rotation relative to it, and a third gearset element of the first planetary gearset is at least indirectly connected to a first gearset element of the second planetary gearset so as to be fixed with respect to rotation relative to it. A second gearset element of the second planetary gearset is at least indirectly connected or connectible to a second gearset element of the epicyclic gear train so as to be fixed with respect to rotation relative to it. A third gearset element of the second planetary gearset is connected to the second output shaft so as to be fixed with respect to rotation relative to it. A first gearset element of the epicyclic gear train is connected or connectible to the input shaft so as to be fixed with respect to rotation relative to it. A third gearset element of the epicyclic gear train is connected or connectible to the stationary structural component so as to be fixed with respect to rotation relative to it. A first output torque is transferable to the first output shaft by the first planetary gearset. A reaction torque of the first planetary gearset is transformable in the second planetary gearset such that a second output torque corresponding to the first output torque is transferable to the second output shaft.

In other words, the sums of both wheel torques are not unified or combined in a component part to form a common axle torque. On the contrary, the driving power introduced into the input shaft is divided in the integral differential and, corresponding to the construction and connection of the planetary gearsets and of the epicyclic gear train, is conveyed to the output shafts operatively connected to the latter. Therefore, the component parts of the integral differential can be formed slimmer because of the comparatively small torque. Further, there is a reduction in the quantity and weight of component parts. Consequently, a gear unit is provided in which, by the integral differential, the two functions of torque conversion and torque distribution which were previously carried out by two separate assemblies can be performed by an individual integral assembly. Accordingly, one aspect of the invention involves a combined step-up/differential gear unit which realizes a torque conversion on the one hand and distributes torque to the output shafts on the other hand. In addition, a power splitting is realized.

Within the framework of one aspect of this invention, an integral differential is understood as a differential with a first planetary gearset and with a second planetary gearset operatively connected to the first planetary gearset, and the first planetary gearset is drivingly connected to the input shaft, to the second planetary gearset and to the first output shaft. The second planetary gearset is drivingly connected to the second output shaft. By an integral differential of this kind, the input torque at the input shaft is transformable and can be distributed or transmitted to the two output shafts in a defined ratio. Preferably, 50%, that is, one half, of the input torque is transmitted to each output shaft. Accordingly, the differential has no component part to which the sum of the two output torques is applied. In other words, a summed torque is prevented from occurring. Further, at identical output speeds of the output shafts, the differential has no direct-driving teeth or teeth revolving without rolling motion. Therefore, there is always a relative movement of the meshing component parts of the differential regardless of the output speeds of the output shafts. In particular, the output shafts of the gear unit are adapted to be operatively connected to a wheel of the vehicle. The respective output shaft can be connected to the associated wheel directly or indirectly.

Consequently, the integral differential is constructed as a planetary gear unit with planetary gearsets and gearset elements comprising sun gear, ring gear and a plurality of planet gears guided by a planet carrier on an orbit around the sun gear. The planetary gearsets advantageously have exactly one stationary transmission ratio. By "planetary gearset" is meant in particular a unit having a sun gear, a ring gear and a plurality of planet gears guided by a planet carrier on an orbit around the sun gear. The respective planetary gearsets advantageously have exactly one stationary transmission ratio. By "planetary gearset" is meant in particular a unit having a sun gear, a ring gear and a plurality of planet gears guided by a planet carrier on an orbit around the sun gear. The respective planetary gearset advantageously has exactly one stationary transmission ratio.

The epicyclic gear train is preferably formed as a planetary gear unit and integrated in the integral differential. The epicyclic gear train is connected in parallel with the first planetary gearset and second planetary gearset and, depending on the arrangement of the gearset elements, a power flow can take place from the epicyclic gear train into the second planetary gearset or from the second planetary gearset into the epicyclic gear train. Further, the epicyclic gear train is supported at the input shaft by a gearset element directly or indirectly, i.e., with a shifting element interposed therebetween. A power splitting is realized as a result of one of the gearset elements of the epicyclic gear train being connected to the input shaft of the gear unit so as to be fixed with respect to rotation relative to it. In other words, an additional power-split transmission is provided. The gear unit is an asymmetrical gear unit due to the epicyclic gear train. It is advantageous that the overall efficiency of the gear unit can be improved in this way. A reaction torque of the second planetary gearset is supported in the epicyclic gear train at a stationary structural component and at the input shaft of the gear unit. By "stationary structural component" is meant a structural component part of the gear unit that is fixed with respect to rotation and axially, for example, the gear unit housing.

The gearset elements of the epicyclic gear train form the input, the output and a stationary fixed element of the epicyclic gear train, respectively. The input of the epicyclic gear train is preferably connected or connectible to the input shaft so as to be fixed with respect to rotation relative to it. In a connection of this kind, the input shaft of the gear unit forms the input of the epicyclic gear train. In an arrangement which is connectible so as to be fixed with respect to relative rotation, the input of the epicyclic gear train is selectively coupleable with the input shaft via a clutch. The output of the epicyclic gear train is preferably connected or connectible to the second gearset element of the second planetary gearset of the integral differential so as to be fixed with respect to rotation relative to it. In the case of a co-rotationally fixed connection, the output is formed integral with the second gearset element of the second planetary gearset or is directly connected so as to be fixed with respect to rotation relative to it. In an arrangement which is connectible so as to be fixed with respect to relative rotation, the input of the epicyclic gear train is selectively coupleable with the input shaft via a clutch. Further, a gearset element of the epicyclic gear train forms the torque support for the output torque of the second planetary gearset of the integral differential. In an analogous manner, this gearset element can be directly connected to the stationary structural component so as to be fixed with respect to rotation relative to it or a shifting element is interposed in order to realize a detachable coupling.

The input shaft is preferably adapted to be connected to a driveshaft of a drive unit at least indirectly so as to be fixed with respect to rotation relative to it. The drive unit generates a driving power which is transferred to the input shaft via the driveshaft. The driveshaft of the drive unit can be connected to the input shaft so as to be fixed with respect to rotation relative to it. Alternatively, the driveshaft and the input shaft are a cohesive or integral component.

Depending on the construction of the powertrain, two or more input shafts can also be provided, particularly if the powertrain is a hybridized powertrain and two or more drive units are therefore provided.

By "shaft" is meant a rotatable structural component part of the gear unit via which the associated components of the gear unit are connected to one another so as to be fixed with respect to relative rotation or via which such a connection is made when a corresponding shifting element is actuated. The respective shaft can connect the components axially or radially or both axially and radially. A shaft is not exclusively a rotatably supported, for example, cylindrical, machine element for transmitting torques. On the contrary, it can also refer to general connection elements which connect individual structural component parts or elements to one another, particularly connection elements which connect a plurality of elements to one another so as to be fixed with respect to rotation relative to one another.

The input shaft is preferably formed as a solid shaft. In this way, the input shaft can be formed with a smaller outer diameter so that the input shaft or the rotor shaft can be supported with smaller-diameter rotor bearings, which also saves on installation space. The output shafts are preferably arranged axially parallel to one another. The output shafts are arranged in each instance on an output axle and preferably extend in opposite directions proceeding from the differential and have a parallel offset with respect to one another.

Alternatively, the input shaft is formed as a hollow shaft. In this way, one of the output shafts, preferably the first output shaft, can be guided axially through the input shaft. One of the output shafts is preferably guided through the gear unit and possibly through the drive unit of the powertrain. Accordingly, the respective output shaft is guided through the gear unit "inline", so to speak, in order to transmit a driving power to the wheel which is operatively connected to it. In this case, the output shafts are arranged coaxial to one another. As a result of the coaxial arrangement of the output shafts, a radially slender construction of the gear unit can be realized.

Within the framework of the invention, two structural components of the gear unit being "connected" or "coupled" or "communicating" so as to be co-rotationally fixed means a permanent coupling of these structural components such that they cannot rotate independently from one another. This meaning accordingly comprehends a lasting rotational connection. In particular, no shifting element is provided between these structural components which can be elements of the differential and/or also shafts and/or a co-rotationally fixed structural component of the gear unit; rather, the corresponding structural components are fixedly coupled with one another. A torsionally elastic connection between two component parts is also comprehended as fixed or co-rotationally fixed. In particular, a co-rotationally fixed connection can also include joints, e.g., in order to make possible a steering movement or a deflection of a wheel. In contrast, an arrangement which is connectible so as to fixed with respect to relative rotation is a detachable coupling between two structural component parts which can be executed by a shifting element.

In principle, the planetary gearsets of the gear unit, in particular of the integral differential and epicyclic gear train, may be arranged relative to one another and operatively connected to one another in any manner in order to realize a desired transmission ratio. According to an embodiment example, the first gearset element is a sun gear of the respective planetary gearset, the second gearset element is a planet carrier of the respective planetary gearset, and the third gearset element is a ring gear of the respective planetary gearset. The input shaft is accordingly connected to the sun gear of the first planetary gearset so as to be fixed with respect to rotation relative to it, the first output shaft is connected to the planet carrier of the first planetary gearset so as to be fixed with respect to rotation relative to it, and the ring gear of the first planetary gearset is connected to the sun gear of the second planetary gearset at least indirectly so as to be fixed with respect to rotation relative to it. In particular, the ring gear of the first planetary gearset is connected via a coupling shaft to the sun gear of the second planetary gearset so as to be fixed with respect to rotation relative to it. The ring gear of the second planetary gearset is connected to the second output shaft so as to be fixed with respect to rotation relative to it. The connection of the gearset elements between the first planetary gearset and the second planetary gearset may be changed as desired depending on requirements.

Moreover, further component parts, for example, intermediate shafts or coupling shafts, may be arranged between the above-mentioned component parts. For example, the third gearset element can be connected via an intermediate shaft to the first spur gear so as to be fixed with respect to rotation relative to it.

The first planetary gearset and second planetary gearset are preferably arranged adjacent one another in axial direction. In other words, the gearset elements of the first planetary gearset are arranged in a first common plane and the gearset elements of the second planetary gearset are arranged in a second common plane, the two planes extending substantially parallel and axially adjacent to one another. The respective common plane is substantially perpendicular to the respective axle of the vehicle.

Alternatively, the first planetary gearset and second planetary gearset are arranged to be radially nested. In other words, the gearset elements of the first planetary gearset and second planetary gearset are arranged axially in a common plane. Consequently, the first planetary gearset and second planetary gearset are arranged substantially in a common wheel plane, for which reason the gear unit may be designed to be axially short and therefore particularly compact. The first planetary gearset and second planetary gearset are arranged one above the other considered in radial direction.

The epicyclic gear train preferably has a third planetary gearset with a plurality of gearset elements. A first gearset element of the third planetary gearset is connected or connectible to the input shaft so as to be fixed with respect to rotation relative to it, a second gearset element of the third planetary gearset is connected or connectible to the second gearset element of the second planetary gearset so as to be fixed with respect to rotation relative to it, and a third gearset element of the third planetary gearset is connected or connectible to the stationary structural component so as to be fixed with respect to rotation relative to it. In this case, the third planetary gearset by itself already provides all of the above-mentioned elements of input, output and torque support of the epicyclic gear train. By "element for torque support" is meant a gearset element which is secured to the stationary structural component.

According to the previous exemplary association of gearset elements, the planet carrier of the second planetary gearset is connected or connectible to the planet carrier of the third planetary gearset at least indirectly so as to be fixed with respect to rotation relative to it, in particular via a connection shaft and/or a clutch. The sun gear of the third planetary gearset is connected to the input shaft so as to be fixed with respect to rotation relative to it, that is, directly connected, or is connectible to the input shaft so as to be fixed with respect to rotation relative to it, that is, detachably coupleable via a shifting element. Further, the ring gear of the third planetary gearset of the epicyclic gear train is arranged at the stationary structural component so as to be fixed with respect to rotation relative to it or is connectible to the stationary structural component via a shifting member so as to be fixed with respect to relative rotation.

The connection of the gearset elements between the first planetary gearset, second planetary gearset and third planetary gearset may be changed as desired depending on requirements. For example, it is conceivable that the planet carrier of the second planetary gearset is connected via a connection shaft to the ring gear or to the sun gear of the third planetary gearset so as to be fixed with respect to rotation relative to it or is connectible thereto via a clutch, and the other two respective gearset elements are arranged at the stationary structural component so as to be fixed with respect to rotation relative to it or are connected or connectible to the input shaft so as to be fixed with respect to rotation relative to it. In other words, the ring gear or the sun gear of the third planetary gearset can also be the respective second gearset element of the third planetary gearset.

The epicyclic gear train preferably comprises at least two shifting elements in order to realize at least two gear steps. The shifting elements serve to shift a respective power flow and accordingly set a transmission ratio. This can be carried out depending on a command of the driver and/or depending on an operating state of the vehicle. Depending on the quantity and arrangement of shifting elements, it is possible to switch between at least two different transmission ratios. In order to realize the respective gear step, regardless of the quantity of shifting elements, one of the shifting elements is preferably always closed and the other shifting element or shifting elements are open. Consequently, a multispeed gearbox is realized by the shifting elements.

The respective shifting element can be formed as a brake or as a clutch. In particular, the respective shifting element can be a frictionally engaging shifting element or a positively engaging shifting element. A frictionally engaging shifting element is one that introduces a normal force to two parts or surfaces of gear unit elements to be connected to one another. A mutual displacement of the parts or surfaces is prevented until a counterforce substantially caused by stiction is exceeded. In this way, a frictional engagement is formed for transmitting a torque between the gear unit elements to be connected. In particular, the frictionally engaging shifting element can be formed as a friction shifting element, in particular as a multiple-plate clutch or cone clutch. Further, the frictionally engaging shifting element may be formed as a freewheeling clutch.

A positively engaging shifting element is one in which two parts of the gear unit engage in one another and form a positive engagement for transmitting a torque between two gear unit elements. A positively engaging shifting element, as opposed to the frictionally engaging shifting element, results in a cost-optimized system and, above all, in an efficiency-optimized system. A positively engaging shifting element can be a claw shifting element for realizing a positively engaging connection. The positively engaging shifting element may also be constructed as a freewheeling clutch.

According to an example, the second gearset element of the second planetary gearset and the second gearset element of the third planetary gearset are connected to one another by a connection shaft so as to be fixed with respect to relative rotation. The connection shaft is securable to the stationary structural component via a first brake, the first gearset element of the third planetary gearset is connected to the input shaft so as to be fixed with respect to rotation relative to it, and the third gearset element of the third planetary gearset is securable to the stationary structural component via a second brake. The two brakes are part of the epicyclic gear train. The first brake is provided for shifting a first gear step with a first transmission ratio, and the second brake is provided for shifting a second gear step with a second transmission ratio different from the first transmission ratio. The gear unit accordingly allows a two-speed drive, the planetary gearsets being formed correspondingly as two-speed gearsets.

According to an alternative example, the second gearset element of the second planetary gearset and the second gearset element of the third planetary gearset are connected to one another by a connection shaft so as to be fixed with respect to relative rotation. The connection shaft is securable to the stationary structural component via a first brake, the first gearset element of the third planetary gearset is connectible to the input shaft via a clutch so as to be fixed with respect to relative rotation, and the third gearset element of the third planetary gearset is connected to the stationary structural component so as to be fixed with respect to rotation relative to it. Compared to the previous embodiment example, the arrangement of the shifting element is changed in this case so that a two-speed drive is likewise possible.

According to a further alternative example, the second gearset element of the second planetary gearset is securable to the stationary structural component via a first brake and is connectible to the second gearset element of the third planetary gearset via a clutch so as to be fixed with respect to relative rotation. The first gearset element of the third planetary gearset is connected to the input shaft so as to be fixed with respect to rotation relative to it, and the third gearset element of the third planetary gearset is connected to the stationary structural component so as to be fixed with respect to rotation relative to it. In this case, compared with the previous embodiment example, the arrangement of the shifting element is switched so that a two-speed drive is also possible.

Further, the epicyclic gear train preferably has a fourth planetary gearset, which is operatively connected to the third planetary gearset and which has a plurality of gearset elements. A first gearset element of the fourth planetary gearset is connected or connectible to the input shaft so as to be fixed with respect to rotation relative to it, a second gearset element of the fourth planetary gearset is connected or connectible to the stationary structural component so as to be fixed with respect to rotation relative to it, and a third gearset element of the fourth planetary gearset is connected or connectible to the first gearset element of the third planetary gearset so as to be fixed with respect to rotation relative to it. In this case, the epicyclic gear train is supplemented by a further planetary gearset, which changes the overall efficiency.

According to a further example, the first gearset element of the fourth planetary gearset is connected to the input shaft so as to be fixed with respect to rotation relative to it, the second gearset element of the fourth planetary gearset is securable to the stationary structural component via a first brake, the third gearset element of the fourth planetary gearset is connected to the first gearset element of the third planetary gearset so as to be fixed with respect to rotation relative to it, the second gearset element of the second planetary gearset and the second gearset element of the third planetary gearset are securable to the stationary structural component via a second brake, the first gearset element of the third planetary gearset is connectible via a clutch to the input shaft so as to be fixed with respect to rotation relative to it, and the third gearset element of the third planetary gearset is connected to the stationary structural component so as to be fixed with respect to rotation relative to it. The two brakes and the clutch are part of the epicyclic gear train. The first brake is provided for shifting a first gear step with a first transmission ratio. The second brake is provided for shifting a second gear step with a second transmission ratio which is not equal to the first transmission ratio, and the clutch is provided for shifting a third gear step with a third transmission ratio which is different from the first transmission ratio and second transmission ratio. Compared to the embodiment examples with only one planetary gearset and two shifting elements, a gear unit of this kind makes possible a three-speed drive, and the planetary gearsets are consequently formed as three-speed gearsets.

The third planetary gearset and fourth planetary gearset are preferably arranged axially adjacent one another. Therefore, the gearset elements of the third planetary gearset are arranged in a third common plane and the gearset elements of the fourth planetary gearset are arranged in a fourth common plane, these two planes extending substantially parallel and axially adjacent to one another. The respective common plane is oriented substantially perpendicular to the respective axle of the vehicle. Moreover, the third common plane and fourth common plane are arranged parallel and axially adjacent to the first common plane and second common plane of the first planetary gearset and second planetary gearset, respectively.

One or more planetary gearsets are formed as a negative planetary gearset or as a positive planetary gearset. A negative planetary gearset corresponds to a planetary gearset with a planet carrier on which first planet gears are rotatably mounted, a sun gear and a ring gear, wherein the teeth of at least one of the planet gears mesh with the teeth of the sun gear and also with the teeth of the ring gear so that the ring gear and the sun gear rotate in opposite directions when the sun gear rotates with fixed carrier. A positive planetary gearset differs from the negative planetary gearset in that the positive planetary gearset has first and second, or inner and outer, planet gears which are rotatably mounted on the planet carrier. The teeth of the first, or inner, planet gears mesh with the teeth of the sun gear on one hand and with the teeth of the second, or outer, planet gears on the other hand. Further, the teeth of the outer planet gears mesh with the teeth of the ring gear. As a result, with the planet carrier being fixed, the ring gear and the sun gear rotate in the same direction.

Alternatively, it is also conceivable to form one or more planetary gearsets as stepped planetary gearsets. Each stepped planet gear of the respective stepped planetary gearset preferably comprises a first toothed wheel with a second toothed wheel connected to it so as to be fixed with respect to relative rotation. The first toothed wheel is in meshing engagement, for example, with the sun gear, and the second toothed wheel is correspondingly in meshing engagement with the ring gear, or vice versa. These two toothed wheels may be connected to one another so as to be fixed with respect to relative rotation, for example, via an intermediate shaft or a hollow shaft. In the case of a hollow shaft, this can be rotatably mounted on a pin of the planet carrier. The two toothed wheels of the respective stepped planet gear preferably have different diameters and numbers of teeth in order to adjust a transmission ratio. Moreover, combined planetary gearsets are also contemplated.

By "operatively connected" is meant a non-shiftable connection between two component parts which is provided for a permanent transmission of a driving power, particularly a rotational speed and/or a torque. The connection can be direct or via a fixed transmission. The connection can be carried out, for example, via a fixed shaft, gear teeth, particularly a spur gear toothing, and/or a belt mechanism.

By "at least indirectly" is meant that two component parts are (operatively) connected to one another via at least one further component part arranged between these two component parts or are directly connected to one another. Consequently, further component parts can be arranged between shafts or toothed wheels and operatively connected to the shaft or toothed wheel.

Further interposed components formed, for example, as planetary gear unit, cylindrical gear unit, chain drive, belt drive, angle drive, articulated shaft, torsional damper, multispeed gearbox, or the like, may be arranged between the input shaft and the drive unit. Also, further interposed components such as, for example, articulated shafts, step-up gear units, spring elements and damping elements, or the like, may be arranged between the respective output shaft and the wheel, which is operatively connected thereto.

According to a second aspect of the invention, a powertrain for a vehicle comprises a gear unit according to the previous constructions and a drive unit which is operatively connected to the gear unit. The drive unit is preferably an electric machine. The input shaft is a rotor of the electric machine or is connected to or coupled with the rotor so as to be fixed with respect to rotation relative to it. The rotor is rotatably mounted relative to a stator of the electric machine which is fixed with respect to the housing. The electric machine is preferably connected to an accumulator which supplies the electric machine with electrical energy. Further, the electric machine is preferably controllable or adjustable by power electronics. Alternatively, the drive unit can also be an internal combustion engine. In this case, the input shaft is a crankshaft, for example, or is connected to a crankshaft so as to be fixed with respect to rotation relative to it.

The gear unit is preferably arranged at least partially radially inwardly of the rotor of the electric machine. It is conceivable that one of the planetary gearsets, a plurality of planetary gearsets or all of the planetary gearsets of the integral differential and/or of the epicyclic gear train are arranged radially inside of the rotor of the electric machine. This additionally saves at least axial installation space.

According to a third aspect of the invention, a vehicle comprises a powertrain in accordance with the type described above. The vehicle is preferably a motor vehicle, in particular an automobile (e.g., a passenger vehicle with a weight of less than 3.5 t), bus or truck (buses and trucks, e.g., with a weight of more than 3.5 t). In particular, the vehicle is an electric vehicle or a hybrid vehicle. The vehicle comprises at least two axles, one of the axles forming a drive axle which is drivable by the powertrain. The powertrain is operatively arranged at this driving axle. The powertrain transmits a driving power of the drive unit to the wheels of this axle via the gear unit according to the invention. It is also conceivable for each axle to be provided with a powertrain of this type. The powertrain is preferably a front transverse type construction so that the input shaft and the output shafts are oriented substantially transverse to the longitudinal direction of the vehicle. Alternatively, the powertrain can be arranged diagonal to the longitudinal axis and transverse axis of the vehicle, in which case the output shafts are connected via corresponding joints to the wheels of the respective axle which are arranged transverse to the longitudinal axis of the vehicle.

The above definitions and statements regarding technical effects, advantages, and advantageous forms of the gear unit according to aspects of the invention apply analogously to the powertrain and to the vehicle.

BRIEF DESCRIPTION OF THE DRAWINGS

Embodiment examples of the invention will be explained more fully in the following referring to schematic drawings. Like or similar elements are provided with the same reference numerals. The drawings show.

DETAILED DESCRIPTION OF THE PRESENTLY PREFERRED EMBODIMENTS

Figure 1:
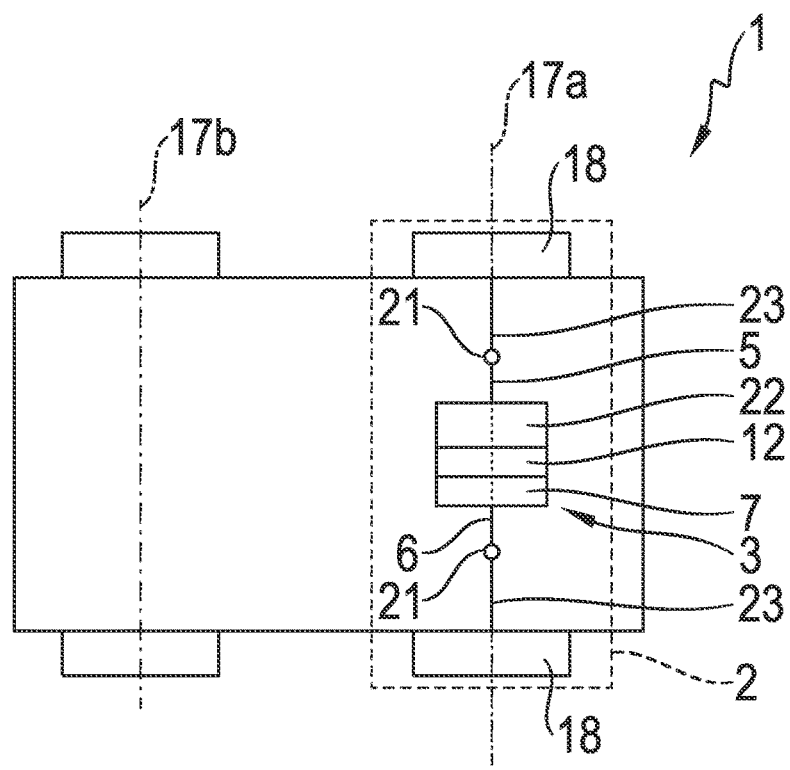
FIG. 1 is a highly schematic top view of a vehicle with a powertrain and a gear unit.

FIG. 1 shows a vehicle 1 according to the invention which is formed in the present instance as an electric vehicle having two axles 17a, 17b. A powertrain 2 according to one aspect of the invention is drivingly arranged at the first axle 17a. The first axle 17a may be a front axle or rear axle of the vehicle 1 and forms a driven axle of the vehicle 1. The powertrain 2 comprises a drive unit 22 constructed as an electric machine and a gear unit 3, which is operatively connected to the latter. The construction and the arrangement of the powertrain 2 in the vehicle 1 will be explained in more detail in the following figures referring to some examples. The electric machine is supplied with electrical energy by an accumulator, which is operatively connected to a stator 19 shown in FIGS. 2 to 6, which is fixed with respect to the housing. Further, the electric machine is connected to power electronics, for controlling and adjusting. By energizing the stator 19, a rotor 20, which is arranged to be rotatable relative to the stator 19 and which is in turn connected as driveshaft to an input shaft 4 of the gear unit 3 so as to be fixed with respect to rotation relative to it, is set in rotation relative to the stator 19. Alternatively, the input shaft 4 can also be connected to or coupled with a separate rotor shaft of the rotor 20 so as to be fixed with respect to rotation relative to it. The driving power of the drive unit 22 is guided via the input shaft 4 into the gear unit 3, where it is converted by an integral differential 7 and divided between a first output shaft 5 and a second output shaft 6. Further, the gear unit 3 has an epicyclic gear train 12 for implementing a power split. A wheel 18 is at least indirectly connected in each instance to the ends of the output shafts 5, 6, which are arranged coaxial to one another in the present instance, in order to drive the vehicle 1. Joints 21 and wheel hubs 23 are arranged between the respective wheel 18 and the output shafts 5, 6 in order to compensate possible tilting of the output shafts 5, 6. Consequently, the vehicle 1 is an electric vehicle and the drive is carried out fully electrically.

FIGS. 2 to 6 show some exemplary embodiments of the powertrain 2, particularly the gear unit 3, in a highly schematic manner. The gear unit 3 is an asymmetrical differential gear unit and in the present instance comprises an input shaft 4, a first output shaft 5 and a second output shaft 6. The output shafts 5, 6 are arranged coaxial to one another and extend in opposite directions. The first output shaft 5 is guided axially through the gear unit 3, particularly through an integral differential 7 and an epicyclic gear train 12 and the drive unit 22.

The integral differential 7 and the epicyclic gear train 12 are operatively arranged between the input shaft 4 and the two output shafts 5, 6. The epicyclic gear train 12 is integrated in the integral differential 7. The integral differential 7 comprises a first planetary gearset 8 with a plurality of gearset elements and a second planetary gearset 9 which is operatively connected to the latter and also has a plurality of gearset elements. In the present instance, at the first planetary gearset 8, the first gearset element is a first sun gear 25a, the second gearset element is a first planet carrier 26a, and the third gearset element is a first ring gear 27a. A plurality of first planet gears 28a in meshing engagement with the first sun gear 25a and the first ring gear 26a are rotatably arranged at the first planet carrier 26a. In the present instance, at the second planetary gearset 9, the first gearset element is a second sun gear 25b, the second gear member is a second planet carrier 26b and the third gear member is a second ring gear 27b. A plurality of second planet gears 28b in meshing engagement with the second sun gear 25b and the second ring gear 27b are rotatably arranged at the second planet carrier 26b. The first planetary gearset 8 and second planetary gearset 9 are formed, respectively, as negative planetary gearset, are radially nested and accordingly arranged in a common plane extending perpendicular to the axle 17a. This economizes on axial installation space. In the present instance, the first planetary gearset 8 is arranged radially inside of the second planetary gearset 9. An axially adjacent arrangement of planetary gearsets 8 and 9 is also readily conceivable.

The epicyclic gear train 12 is likewise formed as a planetary gear unit and comprises a third planetary gearset 10 with a plurality of gearset elements in the examples according to FIGS. 2 to 5. In the present instance, at the third planetary gearset 10, the first gearset element is a third sun gear 25c, the second gearset element is a third planet carrier 26c and the third gearset element is a third ring gear 27c. A plurality of third planet gears 28c which are in meshing engagement with the third sun gear 25c and the third ring gear 27c is rotatably arranged at the third planet carrier 26c. The third planetary gearset 10 is formed as a negative planetary gearset and is arranged axially adjacent to planetary gearsets 8 and 9. One of the gearset elements of the epicyclic gear train 12 in each instance is fixed to rotate with an input 15 of the epicyclic gear train 12, an output 16 of the epicyclic gear train 12 and a stationary structural component 13 of the gear unit 3. This will be explained in more detail in the following.

The third planetary gearset 10 is a component part of the epicyclic gear train 12 for generating at least one transmission ratio between the input shaft 4 and the second gearset element of the second planetary gearset 9 with the assistance of a support at the stationary structural component 13.

The first sun gear 25a of the first planetary gearset 8 is connected to the input shaft 4 so as to be fixed with respect to rotation relative to it. The first planet carrier 26a of the first planetary gearset 8 is connected to the first output shaft 5 so as to be fixed with respect to rotation relative to it. The first ring gear 27a of the first planetary gearset 8 is connected to the second sun gear 25b of the second planetary gearset 9 so as to be fixed with respect to rotation relative to it via a coupling shaft 24. Further, the second ring gear 27b of the second planetary gearset 9 is connected to the second output shaft 6 so as to be fixed with respect to rotation relative to it. The second planet carrier 26b of the second planetary gearset 9 is directly connected to the third planet carrier 26c of the third planetary gearset 10 so as to be fixed with respect to rotation relative to it via a connection shaft 14 according to FIGS. 2 to 4 and is connectible to the third planet carrier 26c of the third planetary gearset 10 so as to be fixed with respect to rotation relative to it via a clutch K according to FIG. 5.

Figure 2:
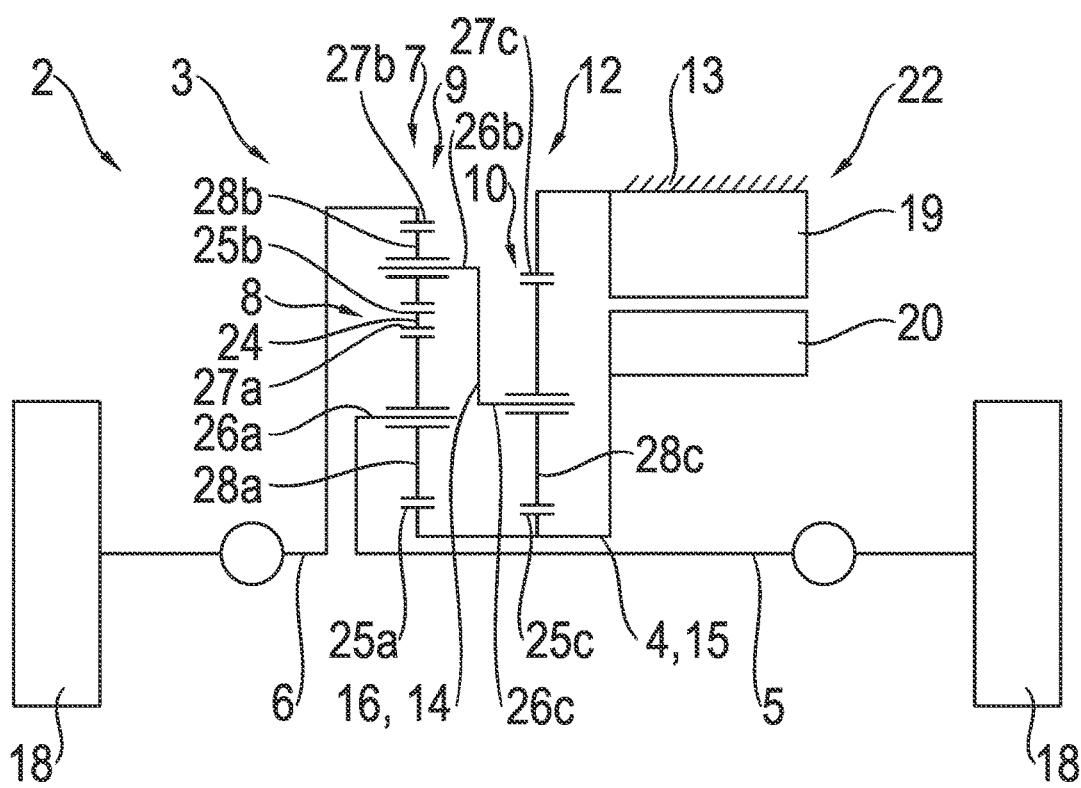
FIG. 2 is a highly schematic diagram of the powertrain from FIG. 1.
Figure 3:
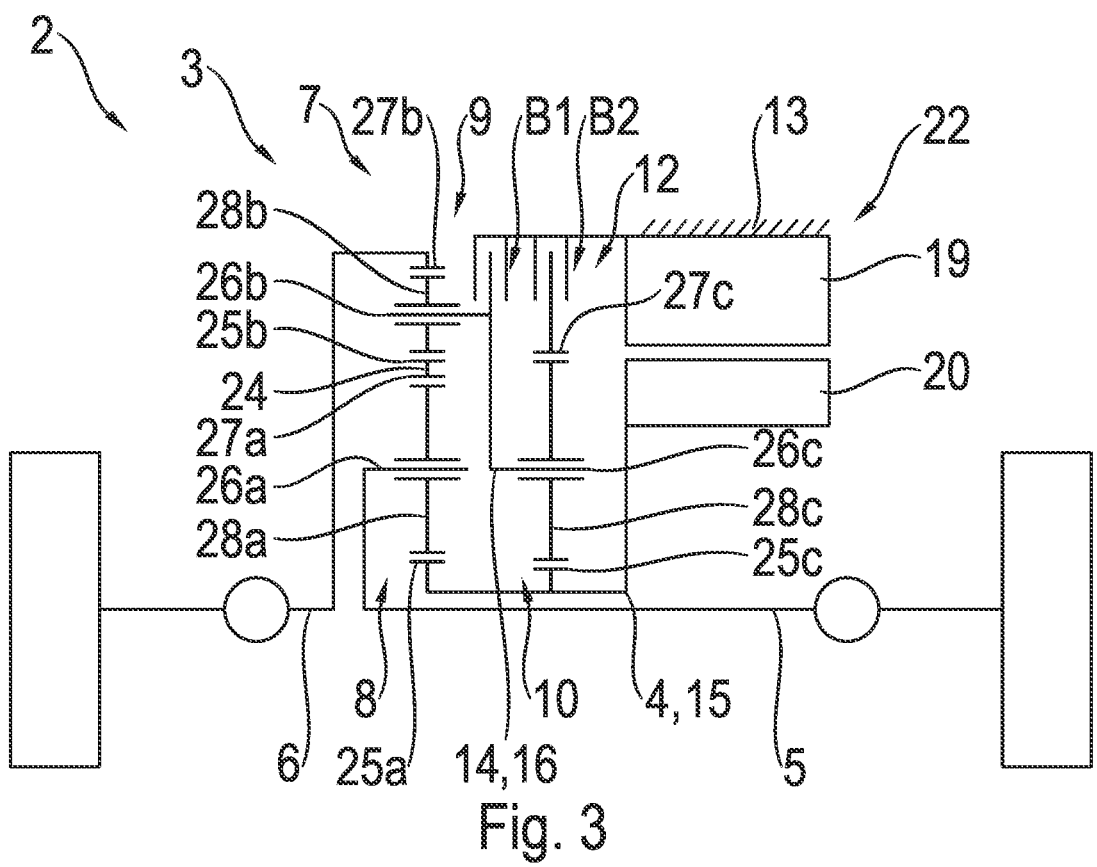
FIG. 3 is a highly schematic diagram of the powertrain with a gear unit.
Figure 4:
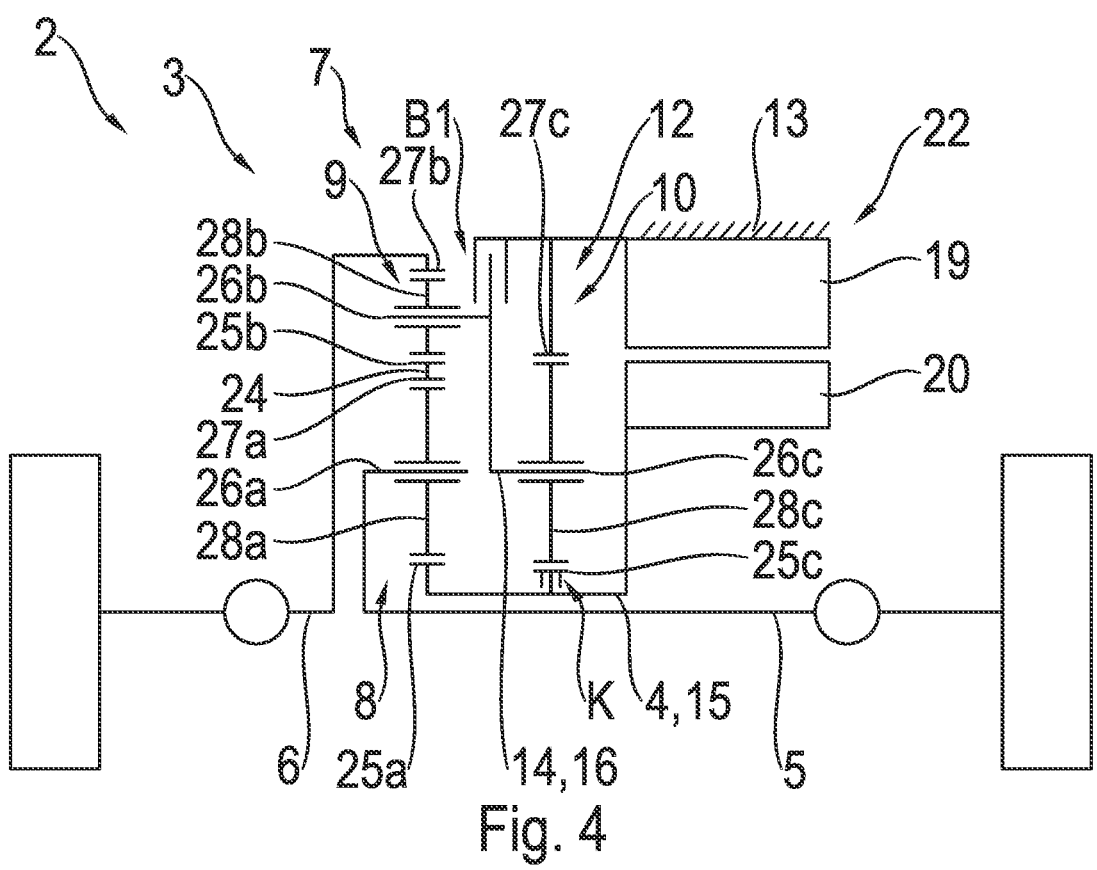
FIG. 4 is a highly schematic diagram of the powertrain with a gear unit.
Figure 5:
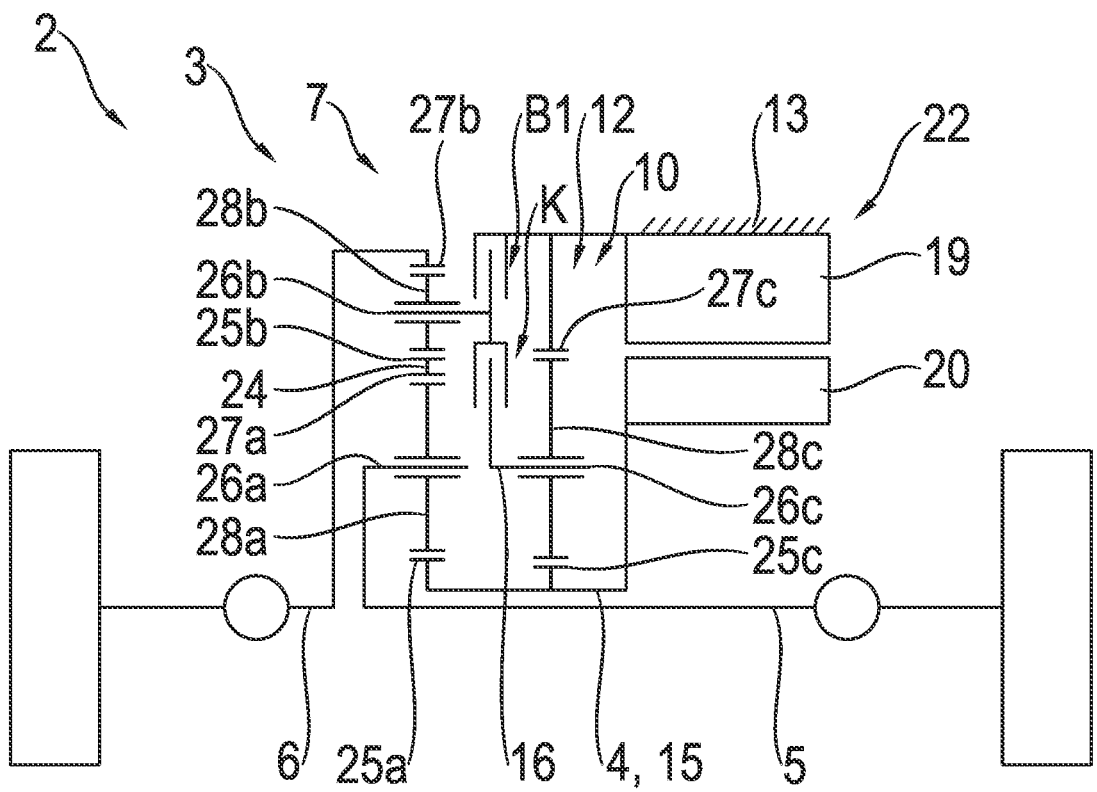
FIG. 5 is a highly schematic diagram of the powertrain with a gear unit.

According to FIG. 2, FIG. 3, and FIG. 5, the third sun gear 25c of the third planetary gearset 10 is connected to the input shaft 4 so as to be fixed with respect to rotation relative to it. According to FIG. 4, the third sun gear 25c of the third planetary gearset 10 is connectible to the input shaft 4 so as to be fixed with respect to rotation relative to it via a clutch K.

According to FIG. 2, FIG. 4, and FIG. 5, the third ring gear 27c of the third planetary gearset 10 is secured to the structural component 13 which is fixed with respect to the housing or is connected to the gear unit housing in a stationary manner. According to FIG. 3, the third ring gear 27c of the third planetary gearset 10 is connectible to the input shaft 4 so as to be fixed with respect to rotation relative to it via a second brake B2.

A first output torque can be transmitted to the first output shaft 5 by the first planetary gearset 8. A reaction torque of the first planetary gearset 8 is transformable in the second planetary gearset 9 such that a second output torque corresponding to the first output torque is transferable to the second output shaft 6. The reaction torque of the second planetary gearset 9 is supported via the epicyclic gear train 12 at the stationary structural component 13, in the present instance the gear unit housing, so as to be fixed with respect to the housing on the one hand and is supported at least indirectly at the input shaft 4 on the other hand.

By "fixed with respect to the housing" is meant that no relative movement takes place or can take place between the respective gearset element that is arranged so as to be fixed with respect to the housing and the stationary structural component of the gear unit.

FIG. 2 shows a basic variant of the powertrain 2 and of the gear unit 3. Driving in a single gear can be realized with this gear unit 3. The housing connection of the second planetary gearset 9 of the integral differential 7 is replaced by a connection to the epicyclic gear train 12 which is connected to the input shaft 4 on the one hand and to the stationary structural component 13 on the other hand. As a result of this arrangement, a uniform distribution of torque to the two output shafts 5, 6 is realized. A parallel power path and, with a suitable specification, an improved efficiency are provided by power splitting. The input 15 of the epicyclic gear train 12 in the present case is formed by the input shaft 4 which is connected to the first sun gear 25a and to the third sun gear 25c so as to be fixed with respect to rotation relative to them. The output 16 of the epicyclic gear train 12 is formed by the third planet carrier 26c which is connected to the second planet carrier 26b so as to be fixed with respect to rotation relative to it via the connection shaft 14. The torque support at the stationary structural component 13 of the gear unit 3 is carried out via the fixed third ring gear 27c.

According to FIG. 3, the epicyclic gear train 12 additionally has a first brake B1 and a second brake B2. The first brake B1 is arranged at the connection shaft 14 and in the closed state secures the latter together with the second planet carrier 26b and third planet carrier 26c to the stationary structural component 13. The second brake B2 is arranged between the third ring gear 27c and the stationary structural component 13 and secures the third ring gear 27c to the stationary structural component 13 in the closed state. For the rest, the construction of the powertrain 2 is identical to the embodiment example in FIG. 2. Consequently, this constitutes a further development of this embodiment example as two-speed gearbox.

The two brakes B1, B2 are arranged in such a way that two gear steps with different transmission ratios and overall efficiencies can be engaged. When the first brake B1 is actuated or closed and the second brake B2 is simultaneously opened, the first gear step is realized, and the epicyclic gear train 12 runs along without function. This is a matter of a direct drive of the integral differential 7. A first wheel torque is generated at the first planetary gearset 8 and is supported at the second planetary gearset 9 of the integral differential 7. The second planetary gearset 9 converts this first reaction torque into a second output torque corresponding to the first output torque. This output torque is supported so as to be fixed with respect to the housing via the second planet carrier 26b when the first brake B1 is closed. In other words, the housing support is carried out after the integral differential 7 in the direction of power flow.

The rotational speed of the output shaft, in the present instance, of the third planet carrier 26c of the epicyclic gear train 12, is defined by actuating or closing the second brake B2 and opening the first brake B1. This rotational speed is compulsorily impressed on the connection shaft 14 and accordingly on the second planet carrier 26b of the integral differential 7. The respective transmission ratio shifted between the input shaft 4 and the connection shaft 14 influences the overall transmission ratio of the drive always with a constant symmetrical torque distribution between the two output shafts 5, 6. A second power path occurs through the third planetary gearset 10. Accordingly, this is a matter of a power-split gear of the integral differential 7. The third planet carrier 26c of the third planet gearset 10 rotates at a sharply reduced speed with respect to the input shaft 4. This reduced speed compels a slowly forward-running second planet carrier 26b at the second planetary gearset 9. In other words, the power that is fed parallel to the integral differential 7 through the third planetary gearset 10 is fed in again. This reduces rollovers in the integral differential 7, improves overall efficiency and reduces the transmission ratio relative to the basic transmission ratio. In so doing, a symmetrical torque distribution to the two output shafts 5, 6 is maintained.

With a closed brake or clutch, a torque and a rotational speed are transmitted between two structural component parts which are connected to or coupled with one another. A relative movement, particularly a relative rotation, between the connected or coupled structural component parts is therefore impossible. With the brake or clutch open, no torque or rotational speed is transmitted. Therefore, there is no connection between the two component parts that prevents a relative movement, particularly a relative rotation.

The input 15 of the epicyclic gear train 12 is formed in the present instance by the input shaft 4 which is connected to the first sun gear 25a and to the third sun gear 25c so as to be fixed with respect to rotation relative to them. The output 16 of the epicyclic gear train 12 is formed by the third planet carrier 26c which is connected to the second planet carrier 26b so as to be fixed with respect to rotation relative to it via the connection shaft 14. The torque support at the stationary structural component 13 of the gear unit 3 is carried out via the fixed third ring gear 27c provided the second brake B2 is closed for implementing the second gear step.

FIG. 4 shows an embodiment form of the gear unit 3 as an alternative to the embodiment according to FIG. 3. Therefore, reference is made to the statements referring to FIG. 3. In the present case, a clutch K is arranged between the third sun gear 25c and the input shaft 4 in place of the second brake B2 between the third ring gear 27c and the stationary structural component 13. In other words, the second planet carrier 26b and the third planet carrier 26c are connected to one another in this case so as to be fixed with respect to relative rotation by the connection shaft 14, this connection shaft 14 being securable to the stationary structural component 13 via the first brake B1. The third sun gear 25c of the third planetary gearset 10 is connectible in the present instance to the input shaft 4 so as to be fixed with respect to rotation relative to it via a clutch K, the third ring gear 27c of the third planetary gearset 10 being permanently connected to the stationary structural component 13 so as to be fixed with respect to rotation relative to it. By closing the clutch K, the second gear step is implemented analogous to the closed second brake B2 according to FIG. 3. In this regard, reference is made to the statements above.

The input 15 of the epicyclic gear train 12 in the present instance is formed by the input shaft 4 which is connected to the first sun gear 25a so as to be fixed with respect to rotation relative to it on the one hand and is connected to the third sun gear 25c so as to be fixed with respect to rotation relative to it on the other hand provided the clutch K is closed for implementing the second gear step. The output 16 of the epicyclic gear train 12 is formed by the third planet carrier 26c which is connected to the second planet carrier 26b so as to be fixed with respect to rotation relative to it via the connection shaft 14. The torque support at the stationary structural component 13 of the gear unit 3 is carried out via the secured third ring gear 27c.

FIG. 5 shows a further embodiment of the gear unit 3 as an alternative to the form according to FIG. 3. Therefore, reference is had to the statements referring to FIG. 3. In the present case, a clutch K is arranged between the second planet carrier 26b of the second planetary gearset 9 and the third planet carrier 26c of the third planetary gearset 10 in place of the second brake B2 between the third ring gear 27c and the stationary structural component 13, namely, in such a way that, with the first brake B1 closed, only the second planet carrier 26b is secured and not also the third planet carrier 26c. In other words, the second planet carrier 26b of the second planetary gearset 9 is securable to the stationary structural component 13 via the first brake B1 and is connectible to the third planet carrier 26c of the third planetary gearset 10 so as to be fixed with respect to rotation relative to it via the clutch K, the third sun gear 25c of the third planetary gearset 10 being connected to the input shaft 4 so as to be fixed with respect to rotation relative to it, and the third ring gear 27c of the third planetary gearset 10 being connected to the stationary structural component 13 so as to be fixed with respect to rotation relative to it. By closing the clutch K, the second gear step is realized analogous to the closed second brake B2 according to FIG. 3. In this regard, reference is made to the preceding statements.

The input 15 of the epicyclic gear train 12 is formed in the present instance by the input shaft 4 which is connected to the first sun gear 25*a* and the third sun gear 25*c* so as to be fixed with respect to rotation relative to them. The output 16 of the epicyclic gear train 12 is formed by the third planet carrier 26*c* which, to this extent, is connected to the second planet carrier 26*b* provided the clutch K is closed in order to realize the second gear step. The torque support at the stationary structural component 13 of the gear unit 3 is carried out via the secured third ring gear 27*c*.

With appropriate choice of the connections and stationary transmission ratios of the planetary gearsets 8, 9, 10 according to FIG. 3 to FIG. 5, the overall efficiency of the gear unit 3 is preferably better in the second gear step than in the first gear step.

Figure 6:
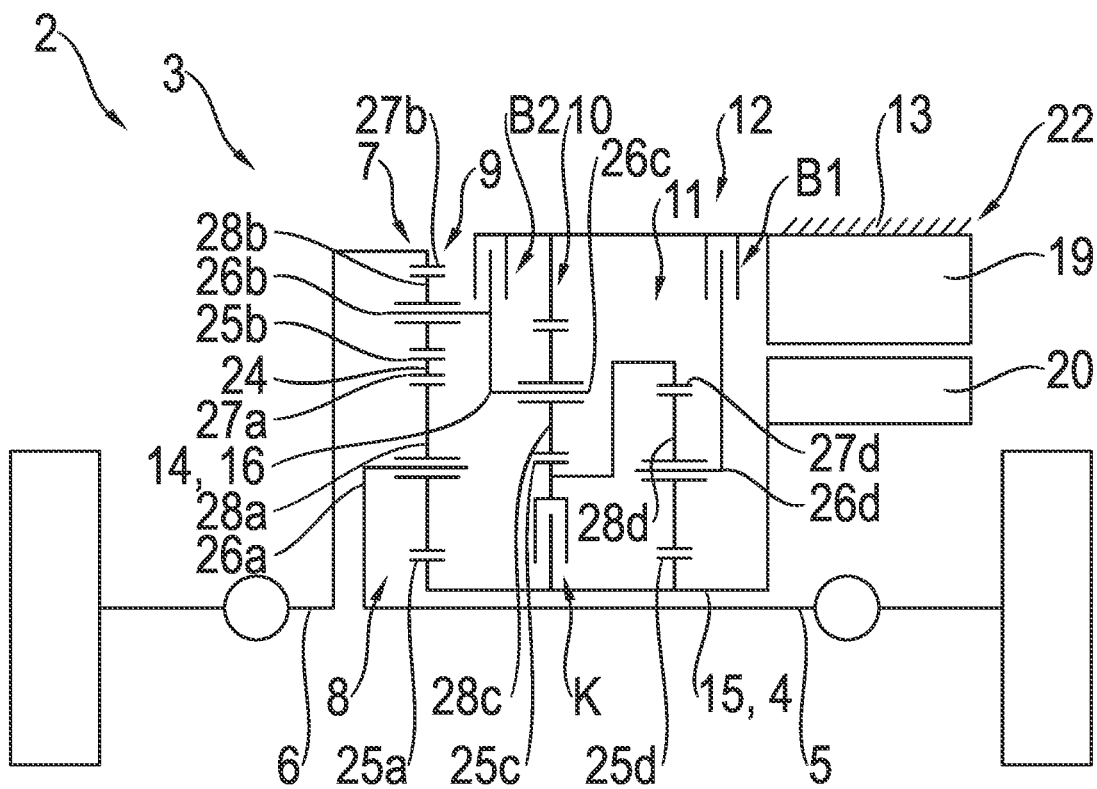
FIG. 6 is a highly schematic diagram of the powertrain with a gear unit.

FIG. 6 shows a further development according to FIG. 3 to FIG. 5 as a three-speed gearbox. Therefore, reference is made to the statements above. In the present case, the epicyclic gear train 12 preferably additionally has a fourth planetary gearset 11 with a plurality of gearset elements that is operatively connected to the third planetary gearset 10. In the present instance, the first gearset element at the fourth planetary gearset 11 is a fourth sun gear 25*d*, the second gearset element is a fourth planet carrier 26*d* and the third gearset element is a fourth ring gear 27*d*, and a plurality of fourth planet gears 28*d* which are in meshing engagement with the fourth sun gear 25*d* and the fourth ring gear 27*d* are rotatably arranged at the fourth planet carrier 26*d*. The fourth planetary gearset 11 is likewise formed as a negative planetary gearset and is arranged axially adjacent to planetary gearsets 8, 9, 10, the third planetary gearset 10 in this instance being axially arranged between the fourth planetary gearset 11 and the radially nested first and second planetary gearsets 8, 9.

The fourth sun gear 25*d* of the fourth planetary gearset 11 is connected in this case to the input shaft 4 so as to be fixed with respect to rotation relative to it. The fourth planet carrier 26*d* of the fourth planetary gearset 11 is connectible to the stationary structural component 13 so as to be fixed with respect to rotation relative to it via a first brake B1. The fourth ring gear 27*d* of the fourth planetary gearset 11 is connected to the third sun gear 25*c* of the third planetary gearset 10 so as to be fixed with respect to rotation relative to it. The connection shaft 14 that connects the second planet carrier 26*b* and the third planet carrier 26*c* to one another so as to be fixed with respect to relative rotation is securable to the stationary structural component 13 via a second brake B2. Further, the third sun gear 25*c* is connectible to the input shaft 4 so as to be fixed with respect to rotation relative to it via a clutch K. In the present instance, the third ring gear 27*c* is connected to the stationary structural component 13 so as to be fixed with respect to rotation relative to it.

The utilized basic gearset of the integral differential 7, i.e., the first planetary gearset 8 and the second planetary gearset 9, is identical to the preceding embodiment forms. The present epicyclic gear train 12 also has the required interfaces; specifically, in the present case, the input shaft 4 also forms the input 15 of the epicyclic gear train 12, the housing support being carried out at the third ring gear 27*c* of the third planetary gearset 10. The output 16 of the epicyclic gear train 12 is formed by the third planet carrier 26*c*.

The second gear step is produced by actuating or closing the second brake B2 while the first brake B1 and clutch K remain open at the same time. Analogous to the preceding embodiments, the support of the second output torque is carried out directly at the stationary structural component 13. The third planetary gearset 10 is securely braked with no load, and the fourth planetary gearset 11 runs under no load.

The third gear step is produced when the clutch K is actuated or closed and the two brakes B1, B2 are open. This gear step is analogous to the second gear step in the embodiment forms according to FIG. 3 to FIG. 5. The fourth planetary gearset 11 runs in direct drive with no load.

The first gear step is realized by closing the first brake B1 and opening the clutch K and second brake 2. In the present instance, the fourth planetary gearset 11 causes a change in rotation direction with respect to the input shaft 4 and transmission ratio at the fourth ring gear 27*d*. In other words, the epicyclic gear train 12 makes possible a reversal of the rotational direction, as a result of which either a power-split high gear or a reactive-power low gear can be provided. The power is further stepped up in the third planetary gearset 10 and compels a second planet carrier 26*b* at the second planetary gearset 9 to run slowly in reverse. A so-called reactive power flow occurs from the second planet carrier 26*b* via the third planetary gearset 10 and fourth planetary gearset 11 back to the input shaft 4. This reactive power flow increases the torque at the input of the integral differential 7. The advantage of this connection consists in that the overall transmission ratio is increased relative to the basic transmission ratio of the integral differential 7.

With compulsory superposition of the one rotational direction, that is, when power is fed in at the second gearset element of the second planetary gearset 9, in this case at the second planet carrier 26*b*, the power splitting makes possible an improvement in the efficiency of the system overall. The transmission ratio is then quantitatively smaller, i.e., rotating faster at the output, with respect to the basic transmission ratio.

During compulsory superposition with the other rotational direction, that is, when power is taken off at the second gearset element of the second planetary gearset 9 or at the second planet carrier 26*b*, a reactive power occurs which worsens efficiency, but a quantitative increase in the transmission ratio is realized. In so doing, the output is slower. The rotational direction depends on the construction of the integral differential 7, particularly of the first planetary gearset 8 and second planetary gearset 9.

It is explicitly noted that the association of the gearset elements with the elements of the respective planetary gearset 8-11 can be changed as desired. Also, the respective sun gear or the respective ring gear can be the second gearset element of the respective planetary gearset 8-11. It is further noted with respect to the embodiment example shown in FIG. 6 that the arrangement of the brakes B1, B2 and of the clutch K can be selected in any desired manner corresponding to the embodiment examples according to FIGS. 3-5, and it must always be ensured that the epicyclic gear train 12 has an input 15, an output 15 and a gearset element secured to the stationary structural component 13. For example, the fourth sun gear 25*d* of the fourth planetary gearset 11 is connectible to the input shaft 4 so as to be fixed with respect to rotation relative to it via a corresponding clutch or the like. Further, the fourth planet carrier 26*d* of the fourth planetary gearset 11 can be connected to the stationary structural component 13 so as to be fixed with respect to rotation relative to it. Further, the fourth ring gear 27*d* of the fourth planetary gearset 11 can be connectible to the third sun gear 25*c* of the third planetary gearset 10 so as to be fixed with respect to rotation relative to it via a clutch or the like.

It is advantageous in the embodiment of the gear unit 3 according to the invention that, with suitable choice of connections and stationary transmission ratios of the planetary gearsets 8, 9, 10, 11, the input torque of the integral differential 7 does not exceed the torque of the drive unit 22 in any gear step.

Because the housing-supporting gearset element is indirectly connected to the stationary structural component 12, that is, via a shifting element, or directly connected, the acoustic decoupling of the respective planetary gearset 10, 11 from the stationary structural component 12 is improved. In other words, the drive unit runs more quietly.

The respective connection of the gearset elements of sun gear, planet carrier and ring gear is carried out depending on the requirements of the transmission ratios, including mathematical sign. Instead of a negative planetary gearset, the respective planetary gearset 8, 9, 10, 11 can always also be formed as a positive planetary gearset in that the connection of the planet carrier and ring gear is switched and the amount of the stationary transmission ratio is increased by 1. The opposite is also possible in analogous manner. The epicyclic gear train 12 can also contain more than two planetary gearsets 10, 11 or combined planetary gearsets. This is relevant particularly when more than two gear steps are required. All conceivable variants of the epicyclic gear train 12 have in common that the shafts of the epicyclic gear train 12 are connectible outwardly by exactly three gearset elements, i.e., the input 15 or input shaft 4, the output 16 or second gearset element of the second planetary gearset and the connection to the stationary structural component 13 or the housing of the gear unit 3.

Further, it is also conceivable to arrange an additional step-up gear unit, not shown, formed, for example, as a planetary gear unit with one or more planetary gearsets between the drive unit 22 and the gear unit 3 in order to increase the overall transmission ratio of the drive.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A gear unit for a powertrain of a vehicle comprising:
   an input shaft;
   a first output shaft;
   a second output shaft; and
   an integral differential operatively arranged between the input shaft and the two output shafts, comprising:
      a first planetary gearset with a plurality of first gearset elements; and
      a second planetary gearset with a plurality of second planetary gearset elements, the second planetary gearset being operatively connected to the first planetary gearset; and
   an epicyclic gear train having a plurality of epicyclic gearset elements, wherein one of the epicyclic gearset elements is connected in each instance to an input of the epicyclic gear train, an output of the epicyclic gear train and a stationary structural component of the gear unit to be fixed with respect to relative rotation,
   wherein:
      a first gearset element of the first planetary gearset is connected to the input shaft to be fixed with respect to rotation relative to it,
      a second gearset element of the first planetary gearset is connected to the first output shaft to be fixed with respect to rotation relative to it, and
      a third gearset element of the first planetary gearset is at least indirectly connected to a first gearset element of the second planetary gearset so as to be fixed with respect to rotation relative to it,
   wherein:
      a second gearset element of the second planetary gearset is at least indirectly connected or connectible to a second gearset element of the epicyclic gear train to be fixed with respect to rotation relative to it, and
      a third gearset element of the second planetary gearset is connected to the second output shaft to be fixed with respect to rotation relative to it,
   wherein
      a first gearset element of the epicyclic gear train is connected or connectible to the input shaft to be fixed with respect to rotation relative to it, and
      a third gearset element of the epicyclic gear train is connected or connectible to the stationary structural component to be fixed with respect to rotation relative to it,
   wherein a first output torque is transferable to the first output shaft by the first planetary gearset,
   wherein a reaction torque of the first planetary gearset is transformable in the second planetary gearset such that a second output torque corresponding to the first output torque is transferable to the second output shaft.

2. The gear unit according to claim 1, wherein the input shaft is configured to be connected to a driveshaft of a drive unit at least indirectly to be fixed with respect to rotation relative to it.

3. The gear unit according to claim 1, wherein the first planetary gearset and second planetary gearset are arranged to be radially nested or axially adjacent.

4. The gear unit according to claim 1, wherein the epicyclic gear train has a third planetary gearset with a plurality of epicyclic gearset elements,
   wherein:
      a first epicyclic gearset element of the third planetary gearset is connected or connectible to the input shaft to be fixed with respect to rotation relative to it,
      a second epicyclic gearset element of the third planetary gearset is connected or connectible to the second gearset element of the second planetary gearset to be fixed with respect to rotation relative to it, and
      a third epicyclic gearset element of the third planetary gearset is connected or connectible to the stationary structural component to be fixed with respect to rotation relative to it.

5. The gear unit according to claim 4,
   wherein the second gearset element of the second planetary gearset and the second gearset element of the third planetary gearset are connected to one another by a connection shaft to be fixed with respect to relative rotation, wherein the connection shaft is configured to be secured to the stationary structural component via a first brake, wherein the first gearset element of the third planetary gearset is connected to the input shaft to be fixed with respect to rotation relative to it, and wherein the third gearset element of the third planetary gearset is securable to the stationary structural component via a second brake.

6. The gear unit according to claim 4, wherein the second gearset element of the second planetary gearset and the second gearset element of the third planetary gearset are connected to one another by a connection shaft to be fixed with respect to relative rotation, wherein the connection shaft is configured to be secured to the stationary structural component via a first brake, wherein the first gearset element of the third planetary gearset is connectible to the input shaft via a clutch to be fixed with respect to relative rotation, and wherein the third gearset element of the third planetary gearset is connected to the stationary structural component to be fixed with respect to rotation relative to it.

7. The gear unit according to claim 4, wherein the second gearset element of the second planetary gearset is configured to be secured to the stationary structural component via a first brake and is connectible to the second gearset element of the third planetary gearset via a clutch so as to be fixed with respect to relative rotation, wherein the first gearset element of the third planetary gearset is connected to the input shaft so as to be fixed with respect to rotation relative to it, and wherein the third gearset element of the third planetary gearset is connected to the stationary structural component to be fixed with respect to rotation relative to it.

8. The gear unit according to claim 4, wherein the epicyclic gear train further has a fourth planetary gearset operatively connected to the third planetary gearset and which has a plurality of gearset elements, wherein a first gearset element of the fourth planetary gearset is connected or connectible to the input shaft to be fixed with respect to rotation relative to it, wherein a second gearset element of the fourth planetary gearset is connected or connectible to the stationary structural component to be fixed with respect to rotation relative to it, and wherein a third gearset element of the fourth planetary gearset is connected or connectible to the first gearset element of the third planetary gearset to be fixed with respect to rotation relative to it.

9. The gear unit according to claim 8, wherein the first gearset element of the fourth planetary gearset is connected to the input shaft to be fixed with respect to rotation relative to it, wherein the second gearset element of the fourth planetary gearset is configured to be secured to the stationary structural component via a first brake, wherein the third gearset element of the fourth planetary gearset is connected to the first gearset element of the third planetary gearset to be fixed with respect to rotation relative to it, wherein the second gearset element of the second planetary gearset and the second gearset element of the third planetary gearset are configured to be secured to the stationary structural component via a second brake, wherein the first gearset element of the third planetary gearset is connectible via a clutch to the input shaft so as to be fixed with respect to rotation relative to it, and wherein the third gearset element of the third planetary gearset is connected to the stationary structural component so as to be fixed with respect to rotation relative to it.

10. The gear unit according to claim 8, wherein the third planetary gearset and fourth planetary gearset are arranged axially adjacent one another.

11. The gear unit according to claim 1, wherein each first gearset element is a sun gear of a respective planetary gearset, each second gearset element is a planet carrier of the respective planetary gearset, and each third gearset element is a ring gear of the respective planetary gearset.

12. The gear unit according to claim 1, wherein each planetary gearset is formed, respectively, as a negative planetary gearset or as a positive planetary gearset.

13. The gear unit according to claim 9, wherein the third planetary gearset and fourth planetary gearset are arranged axially adjacent one another.

14. A powertrain for a vehicle, comprising:
a gear unit comprising:
an input shaft;
a first output shaft;
a second output shaft; and
an integral differential operatively arranged between the input shaft and the two output shafts, comprising:
a first planetary gearset with a plurality of first gearset elements; and
a second planetary gearset with a plurality of second planetary gearset elements, the second planetary gearset being operatively connected to the first planetary gearset; and
an epicyclic gear train having a plurality of epicyclic gearset elements, wherein one of the epicyclic gearset elements is connected in each instance to an input of the epicyclic gear train, an output of the epicyclic gear train and a stationary structural component of the gear unit to be fixed with respect to relative rotation,
wherein:
a first gearset element of the first planetary gearset is connected to the input shaft to be fixed with respect to rotation relative to it,
a second gearset element of the first planetary gearset is connected to the first output shaft to be fixed with respect to rotation relative to it, and
a third gearset element of the first planetary gearset is at least indirectly connected to a first gearset element of the second planetary gearset so as to be fixed with respect to rotation relative to it,
wherein:
a second gearset element of the second planetary gearset is at least indirectly connected or connectible to a second gearset element of the epicyclic gear train to be fixed with respect to rotation relative to it, and
a third gearset element of the second planetary gearset is connected to the second output shaft to be fixed with respect to rotation relative to it,
wherein
a first gearset element of the epicyclic gear train is connected or connectible to the input shaft to be fixed with respect to rotation relative to it, and a third gearset element of the epicyclic gear train is connected or connectible to the stationary structural component to be fixed with respect to rotation relative to it, wherein a first output torque is transferable to the first output shaft by the first planetary gearset, wherein a reaction torque of the first planetary gearset is transformable in the second planetary gearset such that a second output torque corresponding to the first output torque is transferable to the second output shaft; and a drive unit, operatively connected to the gear unit.

15. The powertrain according to claim 14, wherein the drive unit is an electric machine.

16. The powertrain according to claim 15, wherein the gear unit is arranged at least partially radially inwardly of a rotor of the electric machine.

17. Vehicle comprising at least one powertrain according to claim 15.

* * * * *